Nov. 12, 1935.                    J. C. WAHL                    2,020,667
                                    BRAKE
                            Filed Nov. 8, 1933                5 Sheets-Sheet 2

Inventor
James C. Wahl

By

Attorney

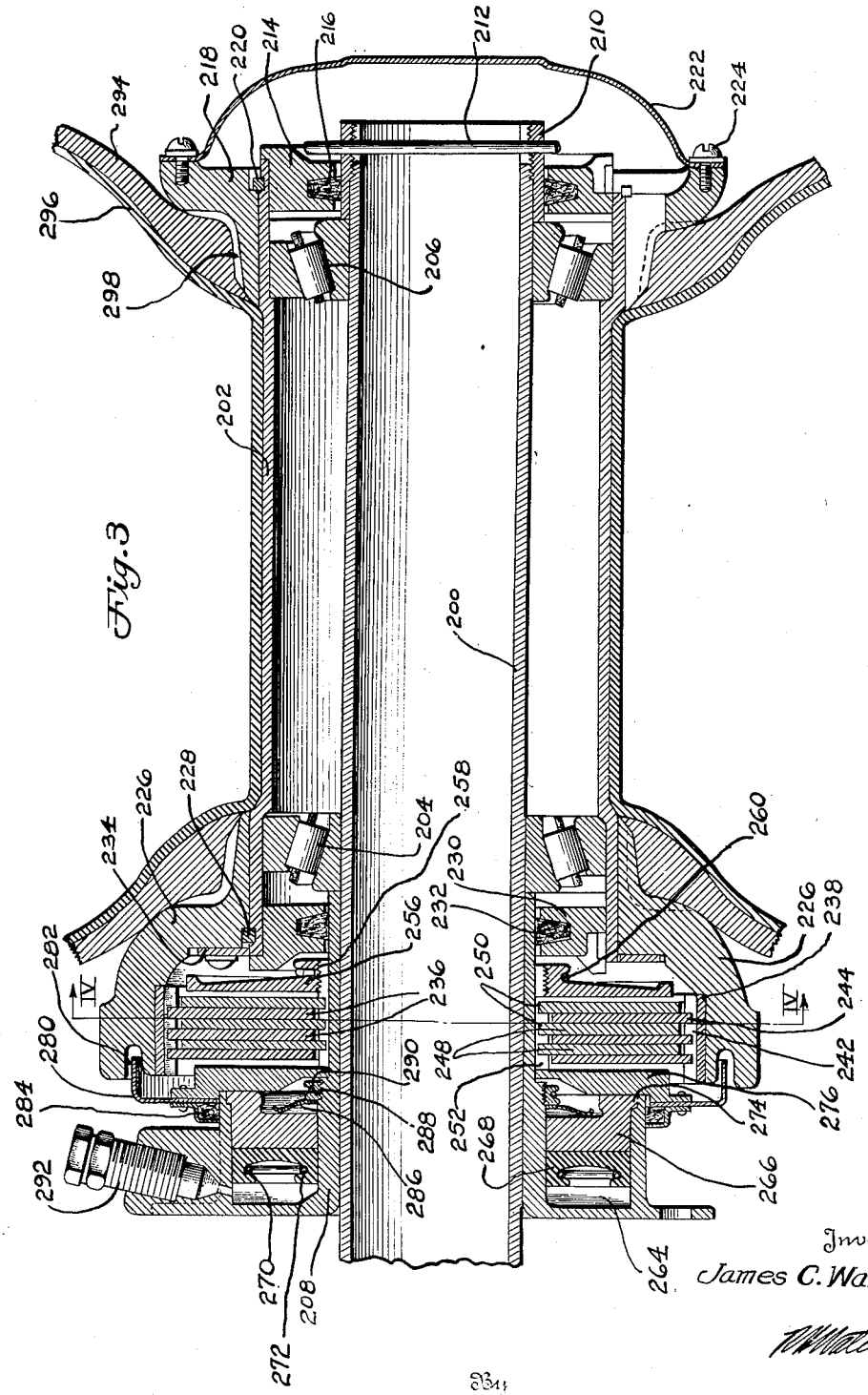

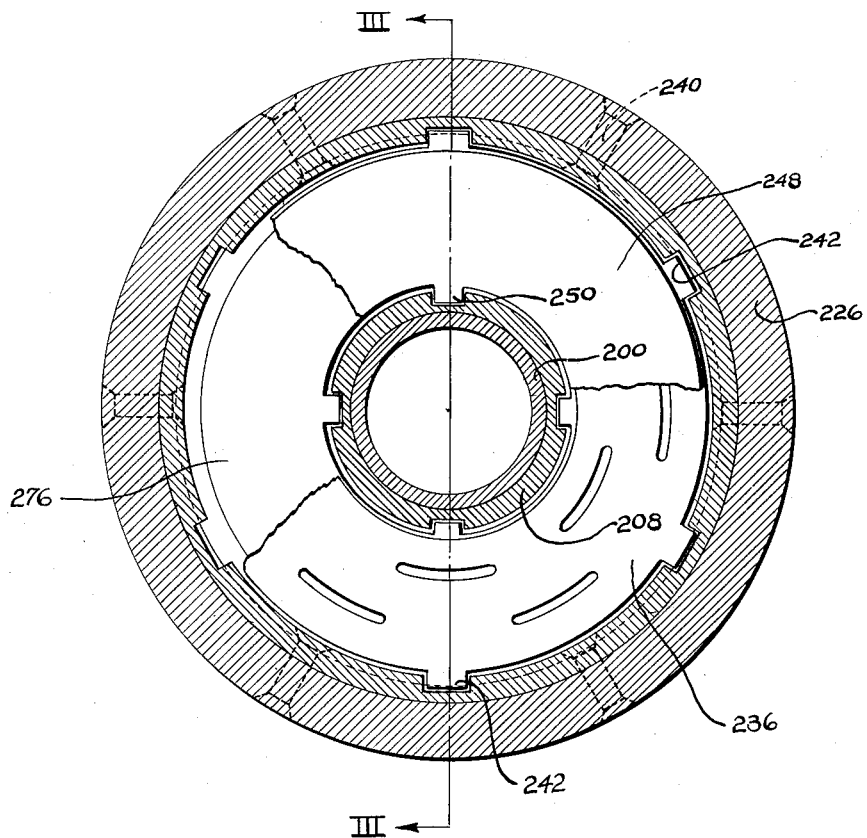

Nov. 12, 1935.   J. C. WAHL   2,020,667
BRAKE
Filed Nov. 8, 1933   5 Sheets-Sheet 5
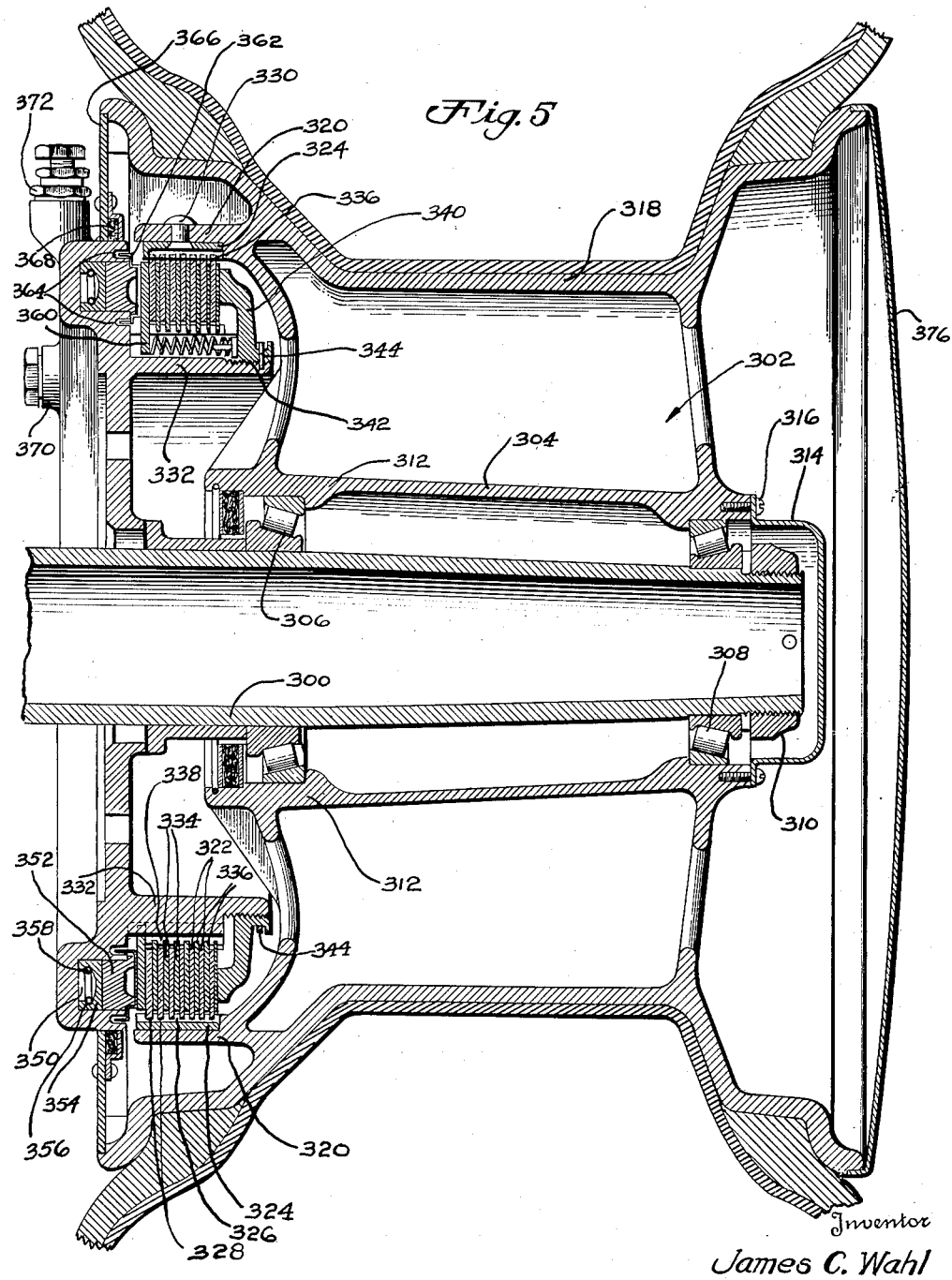
Inventor
James C. Wahl
By
Attorney Patented Nov. 12, 1935

2,020,667

UNITED STATES PATENT OFFICE 2,020,667

BRAKE

James C. Wahl, Akron, Ohio, assignor to Wingfoot Corporation, Wilmington, Del., a corporation of Delaware Application November 8, 1933, Serial No. 697,113

8 Claims. (Cl. 188—18)

This invention relates to brakes and more particularly to hydraulic brakes adapted for use on airplanes and other vehicles in which tires of large cross-sectional and small bead diameters are ordinarily employed which fit directly upon a relatively small supporting hub or wheel.

It is an object of the present invention to provide a simple, effective and long-wearing brake for use with a hub or wheel of relatively small diameter.

Another object of the invention is the provision of an improved hydraulic brake which employs a minimum of wearing parts to produce a maximum of braking power and efficiency.

Another object of the invention is to provide a brake for a tire mounted directly upon a rotatable hub.

Another object of the invention is to provide a disc-type hydraulic brake for super balloon or cushion tires, which brake is particularly adapted for airplane or similar installation, being light in weight, positive in action and long-wearing in use.

Another object of the invention is the provision of a brake which is particularly designed to be associated with an inflated rubber tire and tube with the brake positioned and arranged to be cooled by radiation and by the flow of air over the braking surface without damage by heat to the tire and tube.

Another object of the invention is the provision of a vehicle brake which has a minimum of parts and which can be readily assembled and taken apart and in which wear and breakage is reduced to a minimum. The brake parts are made as far as possible in unitary integral form so that machining, finishing and assembling and repair are readily accomplished.

Another object of the invention is the provision of an improved hydraulic brake in which uniform braking tension is applied over the entire braking surface by means which are simple, long-wearing and positive in action.

Another object of the invention is to provide a fluid brake with an improved piston construction having a materially larger fluid engaging surface than those heretofore used or possible in fluid brakes whereby the working pressure in the system can be considerably reduced without sacrificing ultimate braking pressure. Thus weight and cost of the fluid system are reduced and in addition the muscular effort, on the part of the operator, necessary to effect a braking action is decreased.

Another object of the invention is to provide a hydraulic vehicle brake in which the lubricated and wearing parts are completely protected for all practical purposes from dirt, grit or other foreign matter.

Another object of the invention is to provide a brake assembly in which the braking action is transmitted directly to the tire without any intermediate wearing or strain receiving or carrying parts.

The foregoing and other objects of the invention are achieved by the mechanisms described hereafter and illustrated in the accompanying drawings, wherein:

Fig. 3 is a longitudinal cross-sectional view similar to Fig. 1, and taken on line III—III of Fig. 4, of a second form of the invention.

Fig. 4 is a diametrical cross-sectional view taken on line IV—IV of Fig. 3 and similar to Fig. 2;

Fig. 5 is a longitudinal cross-sectional view of still another form of the invention.

Figure 1:
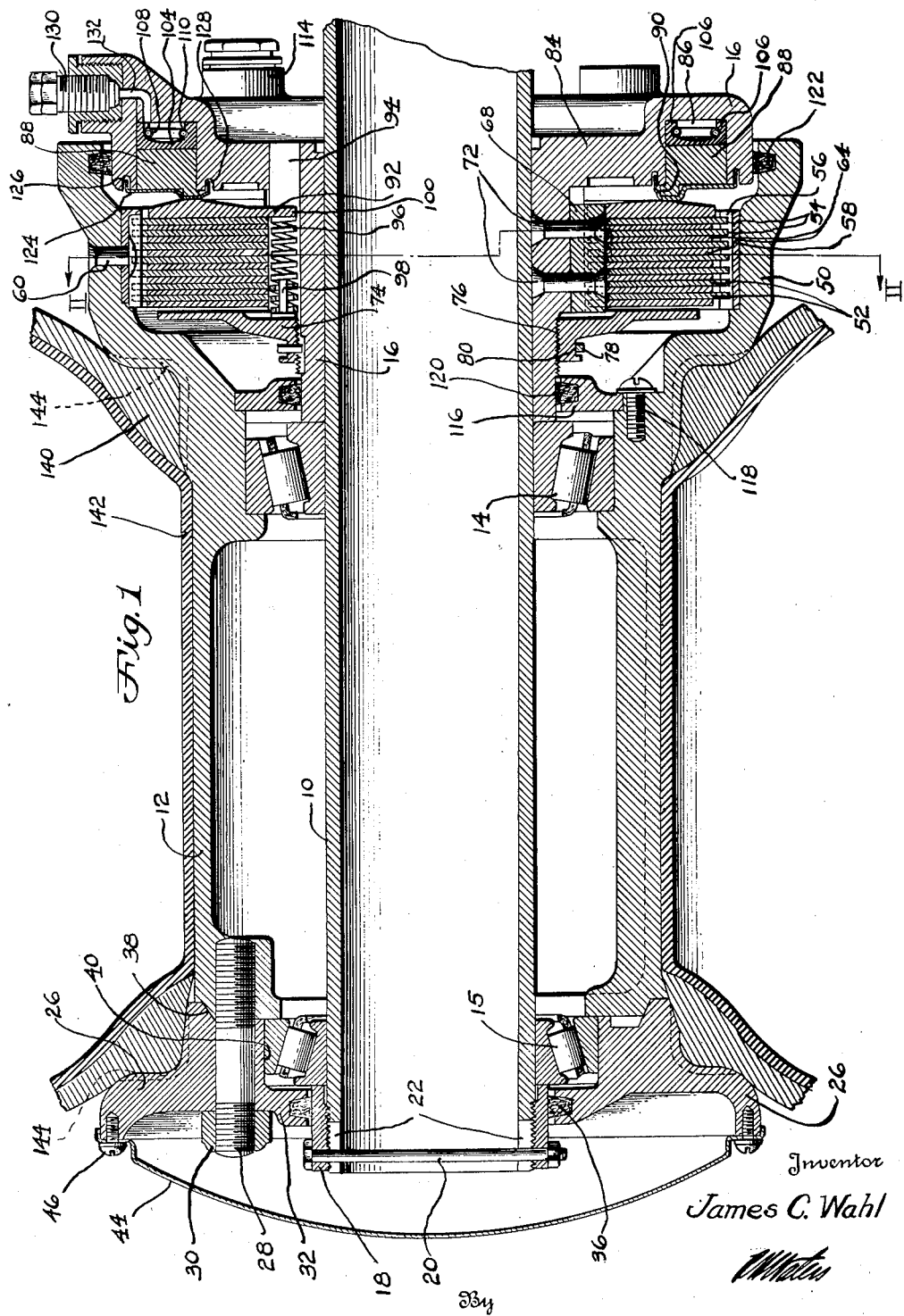
Fig. 1 is a longitudinal vertical cross-sectional view, taken on line I—I of Fig. 2, of one form of the invention.
Figure 2:
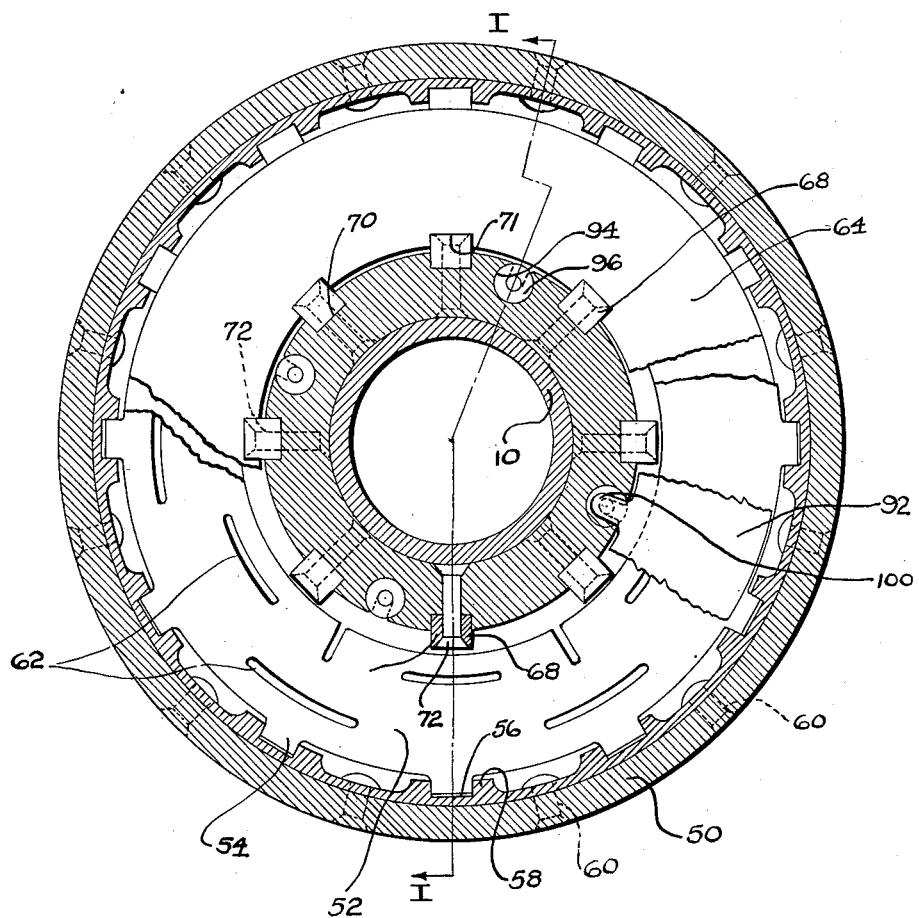
Fig. 2 is a transverse diametrical cross-sectional view taken on line II—II of Fig. 1.

Referring to Figs. 1 and 2 of the drawings, the numeral 10 indicates a fixed or a non-rotatable axle upon which is journaled a rotatable hub 12 through the agency of suitable bearing means such as those indicated at 14 and 15. An anchor bracket 16 is secured by any desired means (not shown) at the inboard or supported end of the axle 10 and this bracket serves as a means against which the inboard bearing 14 can be abutted with the outboard bearing 15 being held in place by a locking collar 18, which is secured on the outboard or outer end of the axle 10 by means such as a bolt 20 which extends diametrically through the collar 18 and through suitable slots 22 in the end of the shaft 10.

Completing the assembly of the outboard end of the brake is a tire retaining flange 26 which is secured in place against the hub 12 by suitable means which may take the form of stud bolts 28 and nuts 30, which are positioned at spaced points around the circumference of the flange 26. As will be seen from the drawings, the tire-retaining flange 26 is formed with a radially inwardly extending portion 32 which is adapted to fit down closely adjacent the collar 18 and ordinarily gasket means, such as those shown at 36, are provided between the collar and the inwardly extending portion 32 in order to seal lubrication in around the bearing 15.

It will also be noted from the drawings that the tire-retaining flange 26 is provided with a beveled portion at its inboard side which cooperates with a beveled end portion of the hub 12, as indicated at 38. By this arrangement of parts the tire-retaining flange and the hub 12 are positively aligned in an axial direction on assembling, as is necessary for a proper operation of the tire wheel and brake unit. The tire-retaining flange 26 is also formed with a cylindrical surface 40 which forms a support or engaging surface for the outboard bearing 15. Some suitable cover or hub cap is ordinarily provided, such as that shown at 44, which completely covers the end of the assembly and which may be secured to the outer periphery of the tire-engaging flange 26 by means which may comprise screws 46.

The brake unit proper is mounted at the inboard end of the hub 12 between the anchor bracket 16 and an enlarged bell-like portion 50 formed preferably integral with the hub 12. The brake unit consists of a plurality of braking discs 52 which are adapted to be axially keyed to the bell-like portion 50 of the hub 12 as, for example, by providing radially extending tongues or lugs 54 on the discs which are received in cooperating axially extending grooves 56 formed in an anchor ring 58 which is secured as by rivets 60 to the bell portion 50. The use of an anchor ring 58 to support the discs is a distinct improvement over former practices of securing braking discs directly to a supporting member inasmuch as it is possible to make the ring of hardened metal which can be more readily and accurately machined so that any tendency for the lugs 54 to cut into the grooves 56 to prevent free axial movement of the discs is substantially eliminated. The braking discs ? are preferably provided with circumferentially extending and radially extending slots 62 which allow for expansion of the braking discs in use without buckling or binding of the braking parts.

Cooperating with the braking discs 52 are a plurality of interposed braking plates 64 which are axially keyed to the anchor bracket 16 through the agency of keys 68 which are secured in axially extending grooves 70 at circumferentially spaced points on the anchor bracket 16. Suitable slots 71 are provided in the braking plates 64 for the reception of the anchor keys 68 so that the plates can have axial but non-rotative movement on the anchor bracket 16. The keys 68 can be fastened to the anchor bracket with rivets 72 or like means, if desired.

Positioned at the outboard side of the interposed braking discs 52 and braking plates 64 is an abutment or shoulder plate 74 which is adjustably positioned on the anchor bracket 16, as by providing cooperated threaded portions indicated at 76. A locking ring 78 having ends received in an axially extending groove 80 may be employed to lock the abutment or shoulder plate 74 in the desired axial position on the anchor bracket 16. It will be appreciated that this shoulder plate 74 can be adjusted in an axial direction initially or after use to provide an adjustable take-up or a certain initial pressure on the braking plates and discs.

The fluid pressure applying means forming a part of the brake unit are positioned at the inboard side of the braking discs and plates and are carried by any suitable supporting means which preferably take the form of an integral radially extending flange 84 formed on the anchor bracket 16. The flange 84 is provided with an outwardly facing channel 86 which receives a piston 88 for axially reciprocable movement. It will be noted that by making the piston ring shaped and having it surround the axle it is provided with a considerably larger fluid contacting area so that the pressure in the system can be reduced as can the muscular effort required to effect a braking action. The piston 88 is formed with a laterally extending shoulder or ridge 90 which extends into engagement with a pressure plate 92 which engages with the inboard side of the superimposed braking discs and plates. Means are preferably provided to hold the pressure plate 92 at its non-clamping position and to this end axially extending recesses 94 may be formed at circumferentially spaced points in the anchor bracket 16. Springs 96 are placed in these recesses 94, which springs bear at their outboard end against the shoulder plate 74 with a round headed rivet 98 or the like being placed therebetween, as illustrated in Fig. 1, to allow adjustment of the shoulder plate 74 without binding action on the spring 96. The inner ends of the springs 96 bear against radially inwardly extending lugs 100 formed integral with the pressure plate 92 and the operation of parts is such that the expanding action of the springs normally retains the pressure plate 92 and piston 88 in non-clamping position. This axial positioning of a plurality of springs is a novel feature of design which economizes space and which correlates well with the clamping action of the piston.

The fluid pressure means for operating the piston 88 preferably take the form of a ring gasket 104 which is U-shape in cross-section to provide axially extending flange-like lips 106 which lie against the inner and outer circumferential cylindrical walls of the channel 86. In order to positively hold the flange lips 106 of the rim gasket 104 in positive engagement at all times, spring rings 108 and 110 are employed. The spring ring 108 is an expanding ring and is under compression while the spring ring 110 is a compressing ring under tension. Conduit means (not shown) are adapted to extend to the channel 86 at the back of the ring gasket 104 and for this purpose a plurality of axially extending bosses 114 may be formed integral with the flange 84. The bosses 114 are tapped to receive the conduits from the fluid pressure source and serve to conduct the fluid under pressure directly to the back of the gasket ring 104. A plurality of bosses are provided in order to allow the brake and wheel assembly to be employed in various relations with the most accessible connection boss being employed for the pressure conduit.

It will be understood that any suitable pressure fluid can be employed in the system such as oil. However, the invention likewise contemplates the use of air which, due to its weight, would be particularly adapted for use in the system when employed with aircraft.

Means are provided to hold the lubricant around the inboard bearing 14 and away from the braking plates and discs and to this end a ring plate 116 may be secured as by screws 118 to the hub 12, as shown in Fig. 1. Gasket means 120 of suitable character are carried by the ring 116 and engage with the anchor bracket 16. Sealing means are likewise provided at the end of the bell portion 50 of the hub 12 to protect the braking plates and discs against foreign matter and these sealing means may comprise a gasket ring 122 which is positioned between the outer periphery of the flange 84 and the inside of the inboard end of the bell portion 50. A further sealing plate 124 is preferably positioned at the outer side of the piston 88, which plate has axially extending flanges received in grooves 126 and 128 formed in the radial flange 84 of the anchor bracket 16.

An air escape valve 130 is provided at the upper side of the flange portion 84 and a passage 132 extends therefrom to the back of the ring gasket 104. This escape valve 130 is opened when the fluid to be placed under pressure is initially installed in the system and allows the escape of air. The valve is then closed and remains closed for the life of the assembly unless replacement of the braking and pressure fluid is necessary.

A feature of the invention is the particular mounting of a tire such as that shown at 140 directly upon the hub 12 and the retaining flanges 26 and 50. The tire is inflated by the usual inner tube 142 which functions to force the bead portions of the tire tightly against the tire-retaining flanges. The gripping relation or bond between the beads of the tire and the hub and flanges can be increased if cooperating locking ribs and grooves 144 are formed on the contact surfaces of the tire beads and the retaining flanges.

In the embodiment of the invention illustrated in Figs. 3 and 4, the numeral 200 indicates an axle upon which is journaled a hub 202 through the agency of suitable bearing means such as the roller bearings 204 and 206. At the inboard side of the axle 200 an anchor bracket 208 is secured by any suitable means (not shown). The anchor bracket 208 serves as a stop against which the inboard bearing 204 is clamped with the outboard bearing 206 being secured on the axle 200 by a collar 210 which is adjustably locked in position as by a cotter pin 212. As will be seen from the drawings, the collar 210 secures the bearings 204 and 206 and the hub 202 into a compact unit due to the engagement of the bearing means with suitable shoulders on the hub 202 and with the inboard bearing 204 being clamped against the anchor bracket 208.

Means such as a sealing ring 214 are secured at the outboard end of the hub 202 in order to seal lubricant around the outboard bearing 206. The sealing ring 214 carries the packing 216 which engages with the collar 210 as illustrated in Fig. 3. A removable tire-retaining flange 218 is secured as by a locking ring 220 at the outboard end of the hub 202, and a cover plate 222 is preferably provided over the outboard side of the assembly. The cover plate may be fastened in place by screws 224 which extend through the outer circumference of the cap 222 and into the bead-retaining flange 218.

At the inboard side of the hub 202 is mounted a bell-like tire-retaining flange 226 which is removably keyed to the hub as, for example, by a locking ring 228. A sealing plate 230 secured to the inboard end of the hub 202 functions to seal lubricant around the inboard bearing 204 in that a packing element 232 carried by the sealing plate 230 extends into sealing relationship with the anchor bracket 208. A retaining ring 234 secured to the bell-like tire-retaining flange 226 may be employed to secure the locking ring 228 and the sealing plate 230 in proper position.

A plurality of braking discs 236 are carried by the bell-like tire-retaining flange 226, and to this end a mounting ring 238 is secured to the inner end of the bell-like tire-retaining flange 226 by suitable means such as rivets 240. The mounting ring 238 is formed with axially extending, circumferentially spaced grooves 242 which receive radially extending lugs 244 formed on the circumference of the braking discs 236 so that the braking discs can have relative axial movement with the bell-like tire-retaining flange 226, but will be carried thereby without any opportunity for relative rotary movement.

Cooperating with the braking discs 236 are a plurality of interposed braking plates 248 which are mounted for relative axial movement, but non-rotative movement, upon the anchor bracket 208. This is accomplished by providing radially inwardly extending lugs 250 upon the braking plates 248, which lugs are received in suitable axially extending grooves 252 formed at circumferentially spaced points on the anchor bracket 208.

An adjustable abutment or shoulder plate 256 is provided between the outboard side of the braking plates and discs and the hub proper. The shoulder plate 256 is internally threaded and cooperates with a threaded end portion as at 258, formed on the anchor bracket 208. A lock wire or ring 260 is employed to secure the shoulder plate 256 in the adjusted position.

Pressure is applied to the superimposed plates and discs through the agency of ring-like hydraulic pressure means, and to this end the anchor bracket 208 is formed with a channel 264 which is adapted to slidably receive a piston 266. A ring gasket 268, which is C-shaped or U-shaped in cross-section, is provided behind the piston 266 as illustrated in Fig. 3. An expanding spring ring 270 and a contracting spring ring 272 are preferably employed in conjunction with the U-shaped sealing ring 268 in order to positively hold and force the legs or lips of the sealing ring into tight engagement with the walls of the channel 264.

The piston 266 is formed ordinarily with a shoulder 274 which extends into engagement with a pressure plate 276, which actually forms one of the braking plates, and which serves to uniformly apply the pressure from the piston 266 to the superimposed braking discs 236 and braking plates 248. Sealing means such as the shield 280 are provided on the pressure plate 276, which means extend into a suitably shaped groove 282 formed on the inboard side of the bell-like tire retaining flange 226. A gasket 284 may likewise be provided at the inner portion of the shield 280, which gasket extends into sealing relation with the anchor bracket 208. The shield 280 and gasket 284 function to prevent the entrance of foreign material into the interposed braking plates and discs.

Some suitable means are preferably provided for holding the piston 266 normally in a non-clamping position, and these means may take the form of a spring spider 286, which spider is adjustably mounted upon a nut 288 which screws on the anchor bracket 208 with a locking wire or ring 290 being employed to secure the spring spider 286 in the desired adjusted position.

Similar to the embodiment of the invention illustrated in Figs. 1 and 2 and described above, the present embodiment of the invention is provided with an escape valve 292 which is in communication with the channel 264 so that air can be allowed to escape from the fluid system when the fluid is initially placed in the system. Hydraulic pressure is applied behind the piston 266 and ring gasket 268 in any suitable manner. However, these means ordinarily take the form of conduits (not shown), which extend through suitable bosses formed in the anchor bracket 208, which bosses are tapped and which have passages extending to the channel 264.

As illustrated in Fig. 3, a tire 294 is normally mounted directly upon the hub 202 with the usual inner tube 296 being employed to inflate the tire. In order to prevent any relative movement between the tire 294 and the retaining flanges 218 and 226, the contacting portions of the tire beads and flanges may be formed with inter-engaging grooves and ribs such as indicated at 298.

In the form of the invention shown in Fig. 5, the brake and wheel assembly is particularly designed for somewhat larger bead diameter tires and more definitely for large cross-sectional tires of the super balloon or super cushion type, such as employed on airplanes. The assembly is, however, not limited to this use but can be employed in land and other vehicles wherever a wheel and brake assembly of this or similar design is found desirable.

More specifically, the numeral 300 indicates a fixed axle having a tapered periphery which is adapted to journal a wheel, indicated generally at 302, having a hub portion 304 which is journaled on the axle 300 by an inboard bearing 306 and an outboard bearing 308. The hub portion 304 of the wheel 302 is provided with suitable shouldered portions which position the bearings 306 and 308, with the assembly being clamped on the tapered axle 300 through the agency of a retaining nut 310.

A hub cap 314 is secured as by screws 316 over the end of the axle to complete the outer end of the axle assembly. The wheel 302 is of any desired form but is preferably a cast or pressed wheel having an integral drop center rim 318 at its outer periphery. The drop center rim 318 is formed with a cylindrical flange portion 320 which serves to support a plurality of breaking discs 322 for non-rotative but axially slidable movement therein. To this end a supporting ring 324 may be provided, which ring has a plurality of axially extending channels 326 formed therein which receive radially outwardly extending lugs 328 formed on the braking discs 322. The ring 324 may be secured as by rivets 330 to the cylindrical flange 320.

An anchor bracket 312 is secured by suitable means (not shown) to the axle 300 and comprises a cylindrical portion 332 which functions to support a plurality of braking plates 334 which are in interposed cooperating relation with the braking discs 322. The braking plates 334 are mounted for non-rotative but axial movement on the cylindrical portion 332 of the anchor bracket 312 and this arrangement of parts may be accomplished as by providing radially inwardly extending lugs 336 on the plates 334 which are received in axially extending grooves 338 formed at circumferentially spaced positions upon the cylindrical portion 332 of the anchor bracket 312.

Positioned between the wheel 302 and the cooperating braking discs and plates is a shoulder plate 340 which is preferably threaded as at 342 on the cylindrical portion 332 of the anchor bracket 312. A lock ring 344 is employed to lock the shoulder plate 340 in the desired initial or take-up position. The anchor bracket 312 is formed with a circumferential outboardly-facing channel 350 which slidably receives a ring piston 352 which is backed by a ring gasket 354 which is U-shaped in cross-section. The lips of the U-shaped ring gasket 354 are urged into tightly engaging relation with the walls of the channel 350 by an expanding spring ring 356 and a tensioned spring ring 358.

The piston 352 engages through a pressure plate 360 with the superimposed braking discs and braking plates, with a suitable sealing cover 362 being employed between the piston 352 and the pressure plate 360, which sealing plate has axially extending flanges that are received in cooperating grooves 364 in the anchor bracket 312.

Additional sealing means to protect the braking discs and plates from foreign material may comprise a cover plate 366 which is secured at its outer circumference to the drop center rim 318 with suitable gasket means 368 being positioned at the inner circumference of the plate 366 which seal against the anchor bracket 312. Conduits (not shown) from pressure sources may extend to tapped bosses 370 formed on the anchor bracket 312 over the channel 350. In a manner similar to that described heretofore in conjunction with the embodiment of the invention illustrated in Figs. 1 to 4, an escape valve 372 is ordinarily incorporated in the wheel and brake assembly. If desired, an outer cover plate 376 may be included in the assembly to cover the outboard side of the wheel.

It is believed that the operation of the various brake mechanisms will be apparent from the foregoing description. Suffice it to say that in all of the assemblies the rotation of the wheel or hub upon the fixed axle will cause the braking discs carried by the wheel or hub to be carried therewith while the braking plates remain stationary upon the anchor brackets which are secured to the axle. As long as the pressure applying pistons are not forced outwardly by fluid pressure applied behind them, the braking discs and plates will adjust themselves axially upon their anchor keys or feathers so that no braking action will be produced, and this action is readily achieved due to the use of the hardened clamping rings as above described. However, the interposed braking discs and plates can be forced into engaging relation with each other to effect positive braking action by applying fluid pressure behind the pistons and sealing ring gaskets to force the discs and plates against each other and against the adjustable abutment shoulder.

In all forms of the brake the abutment or shoulder positioned between the wheel or hub and the braking discs can be adjusted to bring the interposed braking discs and plates into the proper relation after wear. The abutment shoulder also can be initially positioned to properly cooperate with the pressure applying piston so that there will be no drag on the wheel or hub when no fluid pressure is applied to achieve braking action.

It will be appreciated that the braking plates and discs can be of various materials such as metal or fiber or like substances and that the superimposed plates and discs can be run dry or with a lubricant, as desired. It has been found, however, that making the plates for example of steel and the discs of bronze, and running the brake dry, gives excellent results.

By the present invention a brake has been provided in which the number of parts has been reduced to a minimum with the parts being designed so that they can be readily produced by commercial practices in production quantities. The assembly is simple and positive in operation and means are provided to readily take up wear of the braking elements. The assemblies are of a nature which allows them to be applied to various new or used wheel assemblies with little or no modification thereof. The mechanisms of the present invention are positioned at one side of the hub or wheel so that the heat generated from the brake can be readily dissipated by radiation by the cooling action of air flowing over the brake. Thus the chance for heat from the brake seriously affecting the life of the tire or its inner tube is materially reduced.

The brake and wheel assemblies herein described are designed to be long wearing in use and to have a minimum of replacement parts. The superpressure piston, when applying the braking pressure, applies the same uniformly over a complete circle and with a reduced pressure in the system without sacrificing braking force, gasket means being employed of the nature to insure no leakage of pressure of fluid in use and in which the necessity of a closed pressure bag with its undesirable features is eliminated. Likewise, the braking discs are designed to permit expansion and contraction without buckling and the various parts are formed solid and integral wherever possible, thereby reducing the number of parts and corresponding wear, rattle, etc.

While one of the brake mechanisms comprising the present invention has been particularly illustrated and described in conjunction with wheel assemblies adapted to mount a super cushion tire directly on a hub or a small wheel, it will be recognized that the principles of the invention are readily applicable to braking mechanism for wheel assemblies of all types and designs. The brake mechanism may, therefore, be employed wherever it is desired to effect a braking action between relatively rotatable members.

It will accordingly be appreciated that the present invention is not limited to details of construction shown in the accompanying drawings and described above, but that the invention is intended to broadly cover all features of patentable novelty contained herein as defined in the appended claims.

What I claim is:

1. In combination in a brake and wheel assembly, an axle, a rotatable member journaled on the axle, a tire, means supporting and securing the tire on the member, a disc type brake positioned at one side of the rotatable member, ring clamping means fastening the brake directly to the tire supporting and securing means, said disc type brake likewise surrounding the axle and being anchored thereto, a uniformly expanding ring piston for actuating the brake, a plurality of axially extending springs normally holding the piston in a non-clamping position and round-headed pins at the ends of the springs to allow relative movement of the springs and the members they engage.

2. In a fluid-pressure brake the combination of a fixed member and a rotatable member, a plurality of friction discs alternately connected with said fixed member and said rotatable member, an annular flange carried by said fixed member and having an annular chamber therein, an annular piston in said chamber, a pressure plate keyed to said fixed member for axial movement and interposed between said piston and said friction discs for transmitting pressure from the former to the latter and a sealing ring movable with said piston and pressure plate and having an annular flange engageable with a slot in one of said members for excluding foreign material from said chamber and piston.

3. In a fluid-pressure brake the combination of a fixed member and a rotatable member, a plurality of friction discs alternately connected with said fixed member and said rotatable member, an annular flange carried by said fixed member and having an annular chamber therein, an annular piston in said chamber, a pressure plate keyed to said fixed member for axial movement and interposed between said piston and said friction discs for transmitting pressure from the former to the latter, and a sealing ring interposed between said piston and said pressure plate and movable therewith, said ring bridging said chamber and piston for excluding foreign material therefrom.

4. In a fluid-pressure brake the combination of a fixed member and a rotatable member, a plurality of friction discs alternately connected with said fixed member and said rotatable member, an annular flange on said fixed member and having an annular chamber therein, an annular piston in said chamber, a pressure plate keyed to said fixed member for axial movement and interposed between said piston and said friction discs for transmitting pressure from the former to the latter, and a sealing plate interposed between said piston and said pressure plate and movable therewith, said ring having an annular flange engageable with an annular slot in said first-mentioned flange for excluding foreign material from said chamber and piston.

5. In a fluid-pressure brake the combination of a fixed member and a rotatable member, a plurality of friction discs alternately connected with said fixed member and said rotatable member, an annular flange on said fixed member and having an annular chamber therein, an annular piston in said chamber, a pressure plate keyed to said fixed member for axial movement and interposed between said piston and said friction discs for transmitting pressure from the former to the latter and an annular sealing ring interposed between said piston and said pressure plate and movable therewith, said ring having concentric internal and external circumferential flanges engageable with annular slots in said first-mentioned flange on opposite sides of said chamber.

6. In a fluid-pressure brake the combination of a fixed axle having a wheel rotatably mounted thereon, a sleeve fixed to said axle, a plurality of friction discs alternately connected with said wheel and sleeve, an annular flange on said sleeve and having an annular chamber therein, an annular piston in said chamber, a pressure plate keyed to said sleeve for axial movement and interposed between said piston and said friction discs for transmitting pressure from the former to the latter, and a sealing ring interposed between said piston and said pressure plate and movable therewith, said ring bridging said chamber and piston for excluding foreign material therefrom.

7. In a fluid-pressure brake the combination of a fixed axle having a wheel rotatably mounted thereon, a sleeve fixed to said axle, a plurality of friction discs alternately connected with said wheel and sleeve, an annular flange on said sleeve and having an annular chamber therein, an annular piston in said chamber, a pressure plate keyed to said sleeve for axial movement and interposed between said piston and said friction discs for transmitting pressure from the former to the latter, and a sealing ring interposed between said piston and said pressure plate and movable therewith, said ring having an annular flange engageable with an annular slot in said first-mentioned flange for excluding foreign material from said chamber and piston.

8. In a fluid-pressure brake the combination of a fixed axle having a wheel rotatably mounted thereon, a sleeve fixed to said axle, a plurality of friction discs alternately connected with said wheel and sleeve, an annular flange on said sleeve and having an annular chamber therein, an annular piston in said chamber, a pressure plate keyed to said sleeve for axial movement and interposed between said piston and said friction discs for transmitting pressure from the former to the latter, and an annular sealing ring interposed between said piston and said pressure plate and movable therewith, said ring having concentric internal and external circumferential flanges engageable with annular slots in said first-mentioned flange on opposite sides of said chamber for excluding foreign material from said chamber and piston.

JAMES C. WAHL.